United States Patent
Sambhwani et al.

(10) Patent No.: US 8,345,614 B2
(45) Date of Patent: Jan. 1, 2013

(54) SINGLE CHANNELIZATION CODE HARQ FEEDBACK FOR DC-HSDPA +MIMO

(75) Inventors: Sharad Deepak Sambhwani, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 12/725,379

(22) Filed: Mar. 16, 2010

(65) Prior Publication Data

US 2010/0238886 A1 Sep. 23, 2010

Related U.S. Application Data

(60) Provisional application No. 61/161,038, filed on Mar. 17, 2009.

(51) Int. Cl.
*H04W 24/00* (2009.01)
*G06F 11/00* (2006.01)
*G08C 25/02* (2006.01)

(52) U.S. Cl. .......... 370/329; 370/310; 714/748

(58) Field of Classification Search .......... 370/310, 370/328, 329; 714/748
See application file for complete search history.

(56) References Cited

U.S. PATENT DOCUMENTS

| | | | | |
|---|---|---|---|---|
| 7,774,686 B2* | 8/2010 | Ahn et al. | .......... | 714/776 |
| 7,864,738 B2* | 1/2011 | Kaikkonen et al. | .......... | 370/334 |
| 7,924,754 B2* | 4/2011 | Bergman et al. | .......... | 370/310 |
| 8,176,376 B2* | 5/2012 | Cheng et al. | .......... | 714/748 |
| 8,239,721 B2* | 8/2012 | Pelletier et al. | .......... | 714/749 |
| 2008/0144561 A1* | 6/2008 | Kaikkonen et al. | .......... | 370/315 |
| 2008/0313519 A1* | 12/2008 | Tseng | .......... | 714/748 |
| 2009/0003420 A1* | 1/2009 | Wu et al. | .......... | 375/220 |
| 2010/0202348 A1* | 8/2010 | Sambhwani | .......... | 370/328 |

OTHER PUBLICATIONS

International Search Report and Written Opinion—PCT/US2010/027678—International Search Authority, European Patent Office,Jan. 19, 2011.
QUALCOMM Europe: "HS-DPCCH design framework for MC-HSDPA", 3GPP Draft; R1-090034, 3rd Generation Partnership Project (3GPP), Mobile Competence Centre ; 650, Route Des Lucioles ; F-06921 Sophia-Antipolis Cedex ; France, No. Ljubljana; 20090107, Jan. 7, 2009, XP050317983, [retrieved on Jan. 7, 2009].
Samsung: "Control channel structure for dual-cell HSDPA", 3GPP Draft; R1-081751_CH_Dualcell, 3rd Generation Partnership Project (3GPP), Mobile Competence Centre ; 650, Route Des Lucioles ; F-06921 Sophia-Antipolis Cedex ; France, vol. RAN WGI, No. Kansas City, USA; 20080514, May 14, 2008, XP050110141, [retrieved on May 14, 2008].

* cited by examiner

*Primary Examiner* — Chi Pham
*Assistant Examiner* — Ahmed Elallam
(74) *Attorney, Agent, or Firm* — D. Scott Juneau

(57) ABSTRACT

A method, an apparatus, and a computer program product for wireless communication are provided in which a single channelization code may be utilized on an uplink channel for providing a HARQ ACK/NACK response corresponding to DC-HSDPA+MIMO. Here, the set of channelization codes includes four codeword groups, each codeword group corresponding to a scenario wherein a node B schedules a single transport block or dual transport blocks on each of the two downlink carriers. Thereby, each of the four codeword groups may be designed to have an improved distance property in comparison to the utilization of a single codeword group for all HARQ ACK/NACK hypotheses, reducing errors.

40 Claims, 15 Drawing Sheets

| HARQ-ACK when UE detects a single scheduled transport block on the serving HS-DSCH cell ||
|---|---|
| ACK ||
| NACK ||
| HARQ-ACK when UE detects a single scheduled transport block on the secondary serving HS-DSCH cell ||
| ACK ||
| NACK ||
| HARQ-ACK when UE detects a single scheduled transport block on each of the serving and secondary serving HS-DSCH cells ||
| Response to transport block from serving HS-DSCH cell | Response to transport block from secondary serving HS-DSCH cell |
| ACK | ACK |
| ACK | NACK |
| NACK | ACK |
| NACK | NACK |
| PRE/POST indication ||
| PRE ||
| POST ||

TABLE 1:
GROUP A

FIG. 6

| HARQ-ACK when UE detects a single scheduled transport block on the serving HS-DSCH cell |  |
|---|---|
| ACK | |
| NACK | |
| HARQ-ACK in response to two scheduled transport blocks on the secondary serving HS-DSCH cell | |
| Response to primary transport block from secondary serving HS-DSCH cell | Response to secondary transport block from secondary serving HS-DSCH cell |
| ACK | ACK |
| ACK | NACK |
| NACK | ACK |
| NACK | NACK |

| HARQ-ACK when UE detects a single scheduled transport block on the serving HS-DSCH cell and two scheduled transport block on the secondary serving HS-DSCH cell | | |
|---|---|---|
| Response to primary transport block from serving HS-DSCH cell | Response to primary transport block from secondary serving HS-DSCH cell | Response to secondary transport block from secondary serving HS-DSCH cell |
| ACK | ACK | ACK |
| ACK | ACK | NACK |
| ACK | NACK | ACK |
| ACK | NACK | NACK |
| NACK | ACK | ACK |
| NACK | ACK | NACK |
| NACK | NACK | ACK |
| NACK | NACK | NACK |
| PRE/POST indication | | |
| PRE | | |
| POST | | |

TABLE 2: GROUP B

FIG. 7

| HARQ-ACK when UE detects a single scheduled transport block on the secondary serving HS-DSCH cell ||
|---|---|
| ACK ||
| NACK ||
| HARQ-ACK in response to two scheduled transport blocks on the serving HS-DSCH cell ||
| Response to primary transport block from serving HS-DSCH cell | Response to secondary transport block from serving HS-DSCH cell |
| ACK | ACK |
| ACK | NACK |
| NACK | ACK |
| NACK | NACK |
| HARQ-ACK when UE detects two scheduled transport blocks on the serving HS-DSCH cell and a single scheduled transport block on the secondary serving HS-DSCH cell |||
| Response to primary transport block from serving HS-DSCH cell | Response to secondary transport block from serving HS-DSCH cell | Response to primary transport block from serving HS-DSCH cell |
| ACK | ACK | ACK |
| ACK | NACK | ACK |
| NACK | ACK | ACK |
| NACK | NACK | ACK |
| ACK | ACK | NACK |
| ACK | NACK | NACK |
| NACK | ACK | NACK |
| NACK | NACK | NACK |
| PRE/POST indication |||
| PRE |||
| POST |||

TABLE 3: GROUP C

FIG. 8

| HARQ-ACK in response to two scheduled transport blocks on the serving HS-DSCH cell ||
|---|---|
| Response to primary transport block from serving HS-DSCH cell | Response to secondary transport block from serving HS-DSCH cell |
| ACK | ACK |
| ACK | NACK |
| NACK | ACK |
| NACK | NACK |
| HARQ-ACK in response to two scheduled transport blocks on the secondary serving HS-DSCH cell ||
| Response to primary transport block from secondary serving HS-DSCH cell | Response to secondary transport block from secondary serving HS-DSCH cell |
| ACK | ACK |
| ACK | NACK |
| NACK | ACK |
| NACK | NACK |

TABLE 4:
GROUP D

FIG. 9A

| HARQ-ACK when UE detects two scheduled transport blocks on the serving HS-DSCH cell and two scheduled transport blocks on the secondary serving HS-DSCH cell |||| 
|---|---|---|---|
| Serving HS-DSCH Cell || Secondary Serving HS-DSCH Cell ||
| Response to primary transport block | Response to secondary transport block | Response to primary transport block | Response to secondary transport block |
| ACK | ACK | ACK | ACK |
| ACK | ACK | ACK | NACK |
| ACK | ACK | NACK | ACK |
| ACK | ACK | NACK | NACK |
| ACK | NACK | ACK | ACK |
| ACK | NACK | ACK | NACK |
| ACK | NACK | NACK | ACK |
| ACK | NACK | NACK | NACK |
| NACK | ACK | ACK | ACK |
| NACK | ACK | ACK | NACK |
| NACK | ACK | NACK | ACK |
| NACK | ACK | NACK | NACK |
| NACK | NACK | ACK | ACK |
| NACK | NACK | ACK | NACK |
| NACK | NACK | NACK | ACK |
| NACK | NACK | NACK | NACK |
| PRE/POST indication ||||
| PRE ||||
| POST ||||

TABLE 4: GROUP D

FIG. 9B

| Node B Schedule | SIMO/SIMO | SIMO/MIMO | MIMO/SIMO | MIMO/MIMO |
|---|---|---|---|---|
| | 1/1 (4) | 1/2 (8) | 2/1 (8) | 2/2 (16) |
| Node B Detection Hypothesis or UE Transmit | 1/0 (2) | 1/0 (2) | 2/0 (4) | 2/0 (4) |
| | 0/1 (2) | 0/2 (4) | 0/1 (2) | 0/2 (4) |
| | 0/0 | 0/0 | 0/0 | 0/0 |

Table 5

FIG. 10

|   | HARQ-ACK when UE detects a single scheduled transport block on the serving HS-DSCH cell | |
|---|---|---|
| 1 | ACK | |
| 2 | NACK | |
|   | HARQ-ACK when UE detects a single scheduled transport block on the secondary serving HS-DSCH cell | |
| 3 | ACK | |
| 4 | NACK | |
|   | HARQ-ACK when UE detects a single scheduled transport block on each of the serving and secondary serving HS-DSCH cells | |
| 5 | ACK | ACK |
| 6 | ACK | NACK |
| 7 | NACK | ACK |
| 8 | NACK | NACK |
|   | HARQ-ACK in response to two scheduled transport blocks on the serving HS-DSCH cell | |
|   | Response to primary transport block from serving HS-DSCH cell | Response to secondary transport block from serving HS-DSCH cell |
| 9 | ACK | ACK |
| 10 | ACK | NACK |
| 11 | NACK | ACK |
| 12 | NACK | NACK |
|   | HARQ-ACK in response to two scheduled transport blocks on the serving HS-DSCH cell | |
|   | Response to primary transport block from serving HS-DSCH cell | Response to secondary transport block from serving HS-DSCH cell |
| 13 | ACK | ACK |
| 14 | ACK | NACK |
| 15 | NACK | ACK |
| 16 | NACK | NACK |

Table 6

FIG. 11A

| | HARQ-ACK when UE detects a single scheduled transport block on the serving HS-DSCH cell and two scheduled transport blocks on the secondary serving HS-DSCH cell | | |
|---|---|---|---|
| | Serving HS-DSCH Cell | Secondary Serving HS-DSCH Cell | |
| | Response to primary transport block | Response to primary transport block | Response to secondary transport block |
| 17 | ACK | ACK | ACK |
| 18 | ACK | ACK | NACK |
| 19 | ACK | NACK | ACK |
| 20 | ACK | NACK | NACK |
| 21 | NACK | ACK | ACK |
| 22 | NACK | ACK | NACK |
| 23 | NACK | NACK | ACK |
| 24 | NACK | NACK | NACK |

Table 6

FIG. 11B

| | HARQ-ACK when UE detects two scheduled transport blocks on the serving HS-DSCH cell and a single scheduled transport block on the secondary serving HS-DSCH cell | | |
|---|---|---|---|
| | Serving HS-DSCH Cell | | Secondary Serving HS-DSCH Cell |
| | Response to primary transport block | Response to secondary transport block | Response to primary transport block |
| 25 | ACK | ACK | ACK |
| 26 | ACK | NACK | ACK |
| 27 | NACK | ACK | ACK |
| 28 | NACK | NACK | ACK |
| 29 | ACK | ACK | NACK |
| 30 | ACK | NACK | NACK |
| 31 | NACK | ACK | NACK |
| 32 | NACK | NACK | NACK |

Table 6

FIG. 11C

| | HARQ-ACK when UE detects two scheduled transport blocks on the serving HS-DSCH cell and two scheduled transport blocks on the secondary serving HS-DSCH cell | | | |
|---|---|---|---|---|
| | Serving HS-DSCH Cell | | Secondary Serving HS-DSCH Cell | |
| | Response to primary transport block | Response to secondary transport block | Response to primary transport block | Response to secondary transport block |
| 33 | ACK | ACK | ACK | ACK |
| 34 | ACK | ACK | ACK | NACK |
| 35 | ACK | ACK | NACK | ACK |
| 36 | ACK | ACK | NACK | NACK |
| 37 | ACK | NACK | ACK | ACK |
| 38 | ACK | NACK | ACK | NACK |
| 39 | ACK | NACK | NACK | ACK |
| 40 | ACK | NACK | NACK | NACK |
| 41 | NACK | ACK | ACK | ACK |
| 42 | NACK | ACK | ACK | NACK |
| 43 | NACK | ACK | NACK | ACK |
| 44 | NACK | ACK | NACK | NACK |
| 45 | NACK | NACK | ACK | ACK |
| 46 | NACK | NACK | ACK | NACK |
| 47 | NACK | NACK | NACK | ACK |
| 48 | NACK | NACK | NACK | NACK |
| | PRE/POST indication | | | |
| 49 | PRE | | | |
| 50 | POST | | | |

Table 6

FIG. 11D

SINGLE CHANNELIZATION CODE HARQ FEEDBACK FOR DC-HSDPA +MIMO

CROSS-REFERENCE TO RELATED APPLICATION(S)

Pursuant to 35 U.S.C. §119(e), this application claims the benefit of U.S. Provisional Application Ser. No. 61/161,038 filed on Mar. 17, 2009, the contents of which are hereby incorporated by reference herein in their entirety.

BACKGROUND

1. Field

The present disclosure relates generally to communication systems, and more particularly, to HARQ feedback in a DC-HSDPA+MIMO system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an evolving telecommunication standard is high-speed packet access (HSPA). HSPA is a set of enhancements to the 3G/WCDMA air interface for the Universal Mobile Telecommunications System (UMTS) mobile standard, promulgated by the Third Generation Partnership Project (3GPP). It is designed, among other things, to facilitate greater throughput and reduce latency. However, as the demand for mobile broadband access continues to increase, there exists a need for further improvements in HSPA technology. Preferably, these improvements should be applicable to other multi-access technologies and the telecommunication standards that employ these technologies.

SUMMARY

A method, an apparatus, and a computer program product for wireless communication are provided in which a single channelization code may be utilized on an uplink channel for providing a HARQ ACK/NACK response corresponding to DC-HSDPA+MIMO. Here, the set of channelization codes includes four codeword groups, each codeword group corresponding to a scenario wherein a node B schedules a single transport block or dual transport blocks on each of the two downlink carriers. Thereby, each of the four codeword groups may be designed to have an improved distance property in comparison to the utilization of a single codeword group for all HARQ ACK/NACK hypotheses, reducing errors.

In an aspect of the disclosure, a method of wireless communication over a DC-HSPA network includes selecting a codeword group from a plurality of codeword groups in accordance with a number of transport blocks detected on each of a first carrier and a second carrier, selecting a codeword in the codeword group corresponding to a composite HARQ ACK/NACK in accordance with success or failure in decoding the at least one transport block on the at least one of the first carrier or the second carrier, and utilizing the selected codeword for a channelization code on an uplink channel.

In another aspect of the disclosure, an apparatus for wireless communication over a DC-HSDPA network includes means for selecting a codeword group from a plurality of codeword groups in accordance with a number of transport blocks detected on each of a first carrier and a second carrier, means for selecting a codeword in the codeword group corresponding to a composite HARQ ACK/NACK in accordance with success or failure in decoding the at least one transport block on the at least one of the first carrier or the second carrier, and means for utilizing the selected codeword for a channelization code on an uplink channel.

In yet another aspect of the disclosure, a computer program product includes a computer-readable medium having code for selecting a codeword group from a plurality of codeword groups in accordance with a number of transport blocks detected on each of a first carrier and a second carrier, code for selecting a codeword in the codeword group corresponding to a composite HARQ ACK/NACK in accordance with success or failure in decoding the at least one transport block on the at least one of the first carrier or the second carrier, and code for utilizing the selected codeword for a channelization code on an uplink channel.

In yet another aspect of the disclosure, an apparatus for wireless communication over a DC-HSDPA network includes a processing system configured to select a codeword group from a plurality of codeword groups in accordance with a number of transport blocks detected on each of a first carrier and a second carrier, to select a codeword in the codeword group corresponding to a composite HARQ ACK/NACK in accordance with success or failure in decoding the at least one transport block on the at least one of the first carrier or the second carrier, and to utilize the selected codeword for a channelization code on an uplink channel.

These and other aspects of the disclosure will become apparent to those having ordinary skill in the art upon review of the detailed description, which follows.

BRIEF DESCRIPTION OF THE DRAWINGS

FIG. 6 is a table illustrating a first codeword group according to an aspect of the disclosure.

FIG. 7 is a table illustrating a second codeword group according to an aspect of the disclosure.

FIG. 8 is a table illustrating a third codeword group according to an aspect of the disclosure.

FIGS. 9A and 9B are a table illustrating a fourth codeword group according to an aspect of the disclosure.

FIG. 10 is a table illustrating re-use of certain codewords in different ones of the codeword groups of FIGS. 6-9.

FIGS. 11A to 11D are a table illustrating all 50 HARQ hypotheses for DC-HSDPA+MIMO.

DETAILED DESCRIPTION

Figure 1:
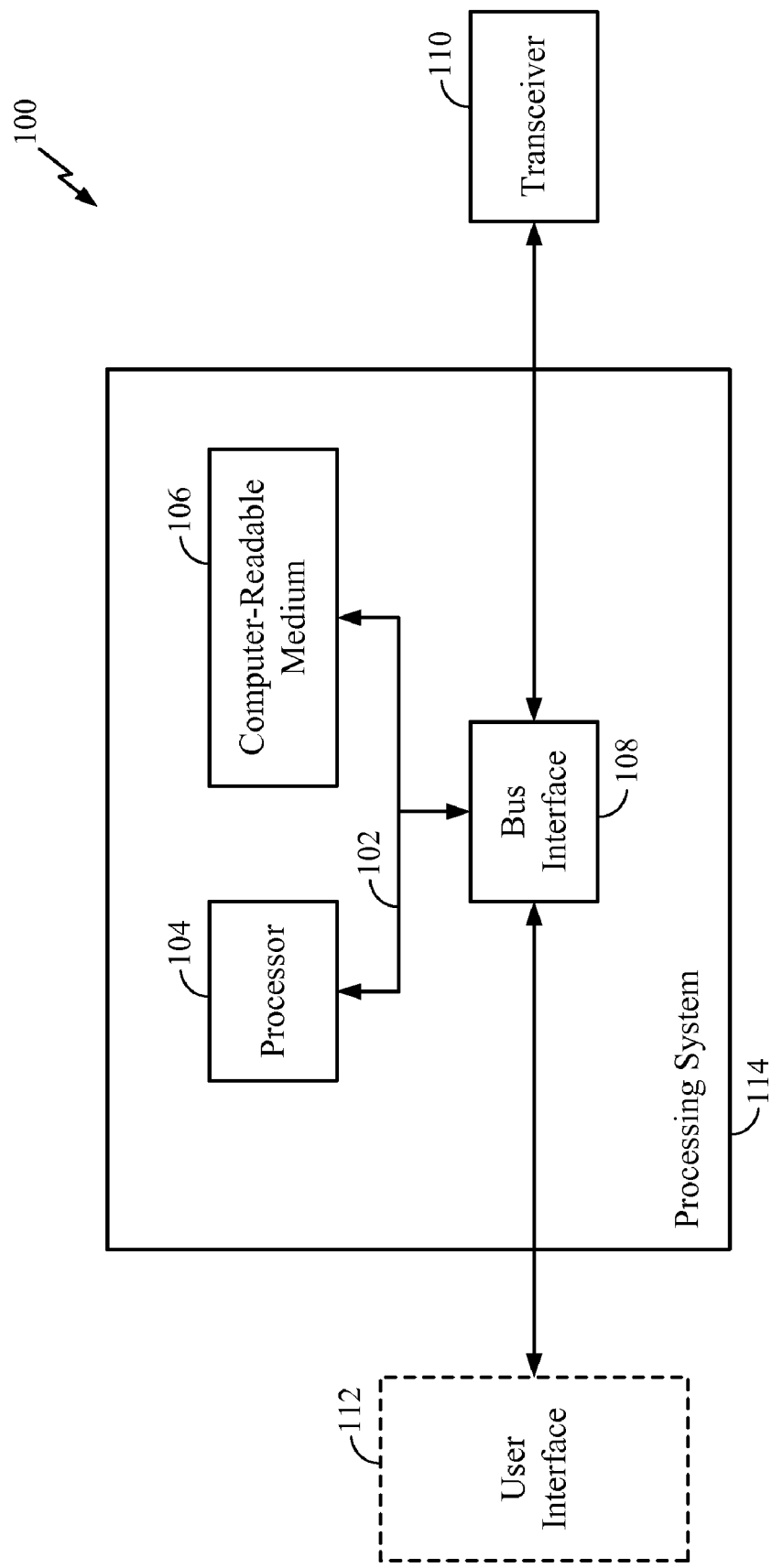
FIG. 1 is a conceptual diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
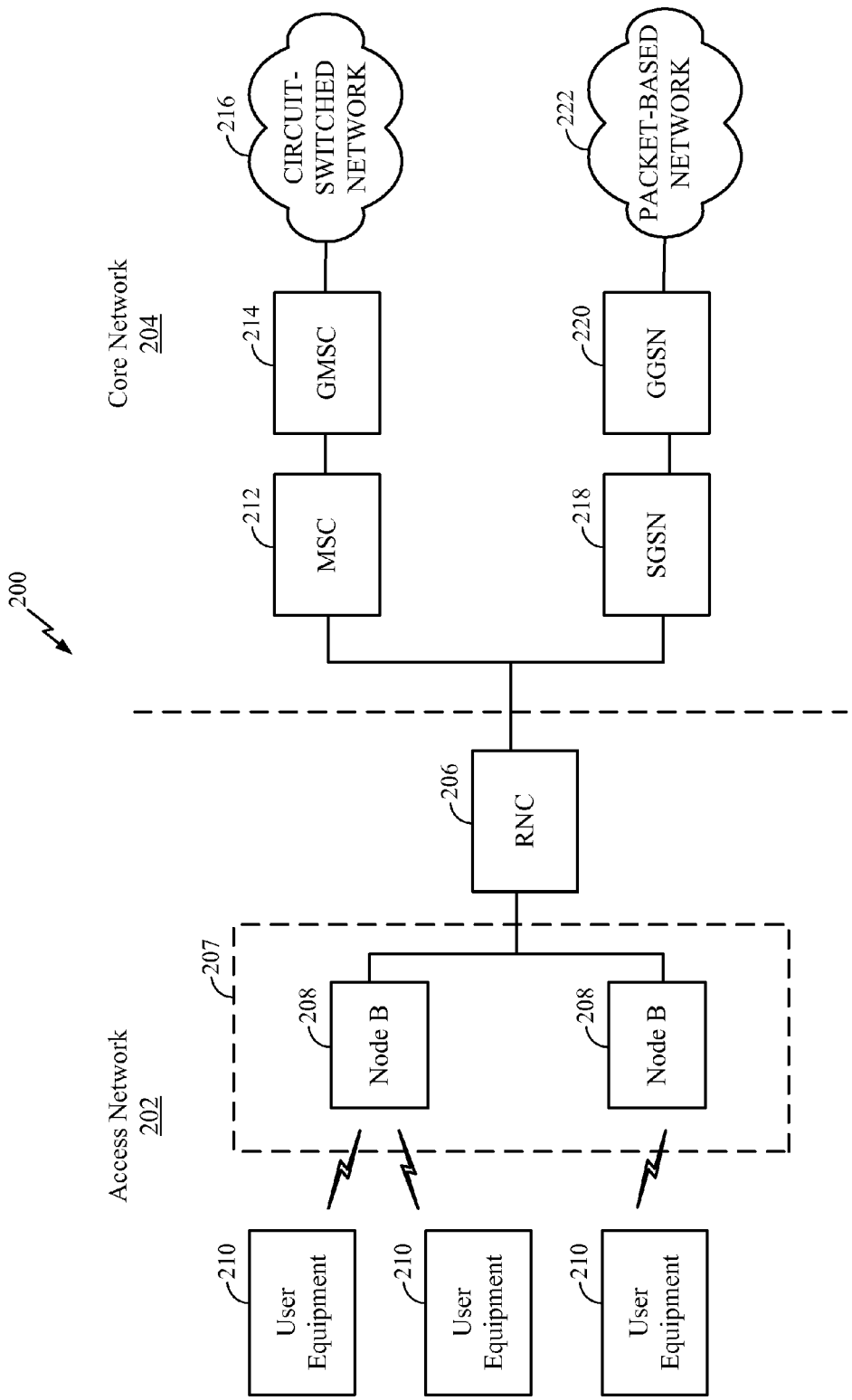
FIG. 2 is a conceptual diagram illustrating an example of a network architecture.

Turning now to FIG. 2, a block diagram is shown illustrating an example of a telecommunications system 200. The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system employing a wideband CDMA (WCDMA) air interface configured for high-speed packet access (HSPA). In this example, the UMTS system includes a (radio access network) RAN 202 (e.g., UTRAN) that provides various wireless services including telephony, video, data, messaging, broadcasts, and/or other services. The RAN 202 may be divided into a number of Radio Network Subsystems (RNSs) such as an RNS 207, each controlled by a Radio Network Controller (RNC) such as an RNC 206. For clarity, only the RNC 206 and the RNS 207 are shown; however, the RAN 202 may include any number of RNCs and RNSs in addition to the RNC 206 and RNS 207. The RNC 206 is an apparatus responsible for, among other things, assigning, reconfiguring and releasing radio resources within the RNS 207. The RNC 206 may be interconnected to other RNCs (not shown) in the RAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 208 are shown; however, the RNS 207 may include any number of wireless node Bs. The node Bs 208 provide wireless access points to a core network 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 210 are shown in communication with the node Bs 208. The downlink (DL), also called the forward link, refers to the communication link from a node B to a UE, and the uplink (UL), also called the reverse link, refers to the communication link from a UE to a node B.

The core network 204, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 204 supports circuit-switched services with a mobile switching center (MSC) 212 and a gateway MSC (GMSC) 214. One or more RNCs, such as the RNC 206, may be connected to the MSC 212. The MSC 212 is an apparatus that controls call setup, call routing, and UE mobility functions. The MSC 212 also includes a visitor location register (VLR) (not shown) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard GSM circuit-switched data services. The GGSN 220 provides a connection for the RAN 202 to a packet-based network 222. The packet-based network 222 may be the Internet, a private data network, or some other suitable packet-based network. The primary function of the GGSN 220 is to provide the UEs 210 with packet-based network connectivity. Data packets are transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 208 and a UE 210, but divides uplink and downlink transmissions into different time slots in the carrier.

The modulation and multiple access scheme employed by the access network 202 may vary depending on the particular telecommunications standard being deployed. In UMTS applications, direct sequence code division multiple access is used on the DL on the UL to support both frequency division duplexing (FDD) and time division duplexing (TDD). As those skilled in the art will readily appreciate from the detailed description to follow, the various concepts presented herein are well suited for UMTS applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be utilized by Universal Terrestrial Radio Access (UTRA) employing Wideband-CDMA (W-CDMA) and other variants of CDMA, such as TD-SCDMA and TD-CDMA; Global System for Mobile Communications (GSM) employing TDMA; and Evolved UTRA (E-UTRA), 3GPP LTE, LTE Advanced, Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The HSPA configuration utilized in this example includes a series of enhancements to the 3G/WCDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

In a typical direct sequence code division multiple access (DS-CDMA) system such as HSPA, data signals on both the uplink and the downlink are each combined with a respective spreading code having a certain chip rate, to separate a plurality of simultaneous transmissions from each other and enable recovery of the individual data signals. For example, on a given downlink carrier, a data stream intended for a given user may be spread by the application of an appropriate spreading code. At the receiving end of the signal, the signal is descrambled and the data stream is recovered by the application of the appropriate spreading code. By utilizing a plurality of spreading codes, multiple codes may be assigned to each subscriber, enabling multiple services to be delivered simultaneously. Similarly, on the uplink, multiple streams may be transmitted from a UE on the same channel by the application of a plurality of channelization codes.

In an aspect of the disclosure, an appropriate choice of a channelization code may enable the encoding of additional information in a data stream. For example, two forms of channelization code may be utilized in a HSDPA link: one for the precoding control indication (PCI) and channel quality indication (CQI), and another for the HARQ ACK/NACK (acknowledgement/non-acknowledgement).

In particular, the channelization code corresponding to the HARQ ACK/NACK may utilize a suitable number of bits to encode the HARQ ACK/NACK status for each transport block on each of the carriers on the downlink.

Systems utilizing HSDPA may implement dual carrier (3GPP uses the term "dual cell") HSDPA (DC-HSDPA), wherein a second HSDPA carrier is utilized by the node B on the downlink. That is, a UE may be scheduled in a primary serving cell as well as in a secondary serving cell over two parallel HS-DSCH transport channels from the same node B. Of course, those skilled in the art will comprehend that either carrier may be configured to function as the primary serving cell or the secondary serving cell for a particular UE. Here, data rates and system capacity may each be increased in comparison to systems that only utilize a single carrier for the downlink.

For DC-HSDPA systems, HARQ ACK/NACK feedback signaling may be sent separately for each downlink carrier, or jointly as a composite HARQ ACK/NACK. For a system that encodes HARQ ACK/NACK according to the selection of channelization codes, if the HARQ ACK/NACK is sent separately for each downlink carrier, the UE may utilize dual channelization codes. When utilizing dual channelization codes, each channelization code may be adapted to provide the HARQ ACK/NACK for one respective downlink carrier.

However, a DC-HSDPA system may implement a single channelization code that provides a composite HARQ ACK/NACK information for both downlink carriers. Here, the channelization code corresponds to a composite HARQ ACK/NACK, that is, an ACK/NACK corresponding to each of the downlink carriers at once.

The use of a single channelization code provides certain advantages, such as easing the evolution to a combination of multiple carriers (MC-HSDPA) and MIMO. For example, a single channelization code for dual carriers may be implemented multiple times, that is, transmitting multiple HS-DPCCH having the channelization code for two carriers each.

"HSPA Evolved" is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 transmits a spatially precoded data stream, which enables the node B 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 3:
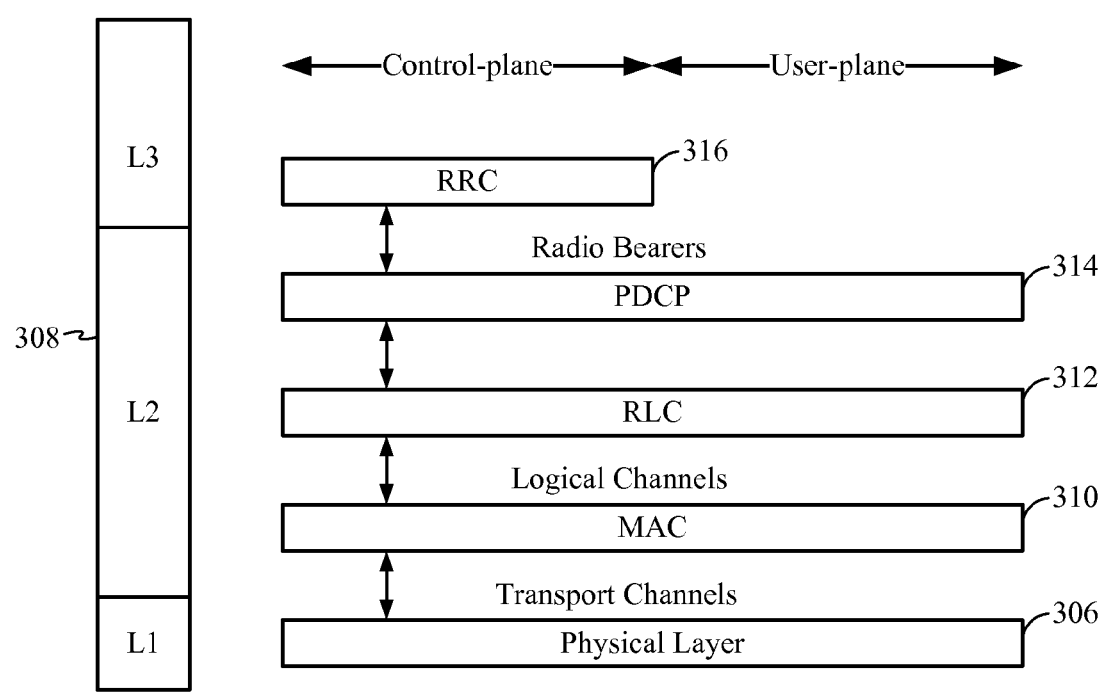
FIG. 3 is a conceptual diagram illustrating an example of a radio protocol architecture for the user and control plane.

The radio protocol architecture may take on various forms depending on the particular application. An example for an HSPA system will now be presented with reference to FIG. 3. FIG. 3 is a conceptual diagram illustrating an example of the radio protocol architecture for the user and control planes.

Turning to FIG. 3, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 306. Layer 2 (L2 layer) 308 is above the physical layer 306 and is responsible for the link between the UE and node B over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the node B on the network side. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between node Bs. The RLC sublayer 312 provides segmentation and reassembly of upper layer data packets, retransmission of lost data packets, and reordering of data packets to compensate for out-of-order reception due to hybrid automatic repeat request (HARQ). The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

In the control pane, the radio protocol architecture for the UE and node B is substantially the same for the physical layer 306 and the L2 layer 308 with the exception that there is no header compression function for the control plane. The control pane also includes a radio resource control (RRC) sublayer 316 in Layer 3. The RRC sublayer 316 is responsible for obtaining radio resources (i.e., radio bearers) and for configuring the lower layers using RRC signaling between the node B and the UE.

Figure 4:
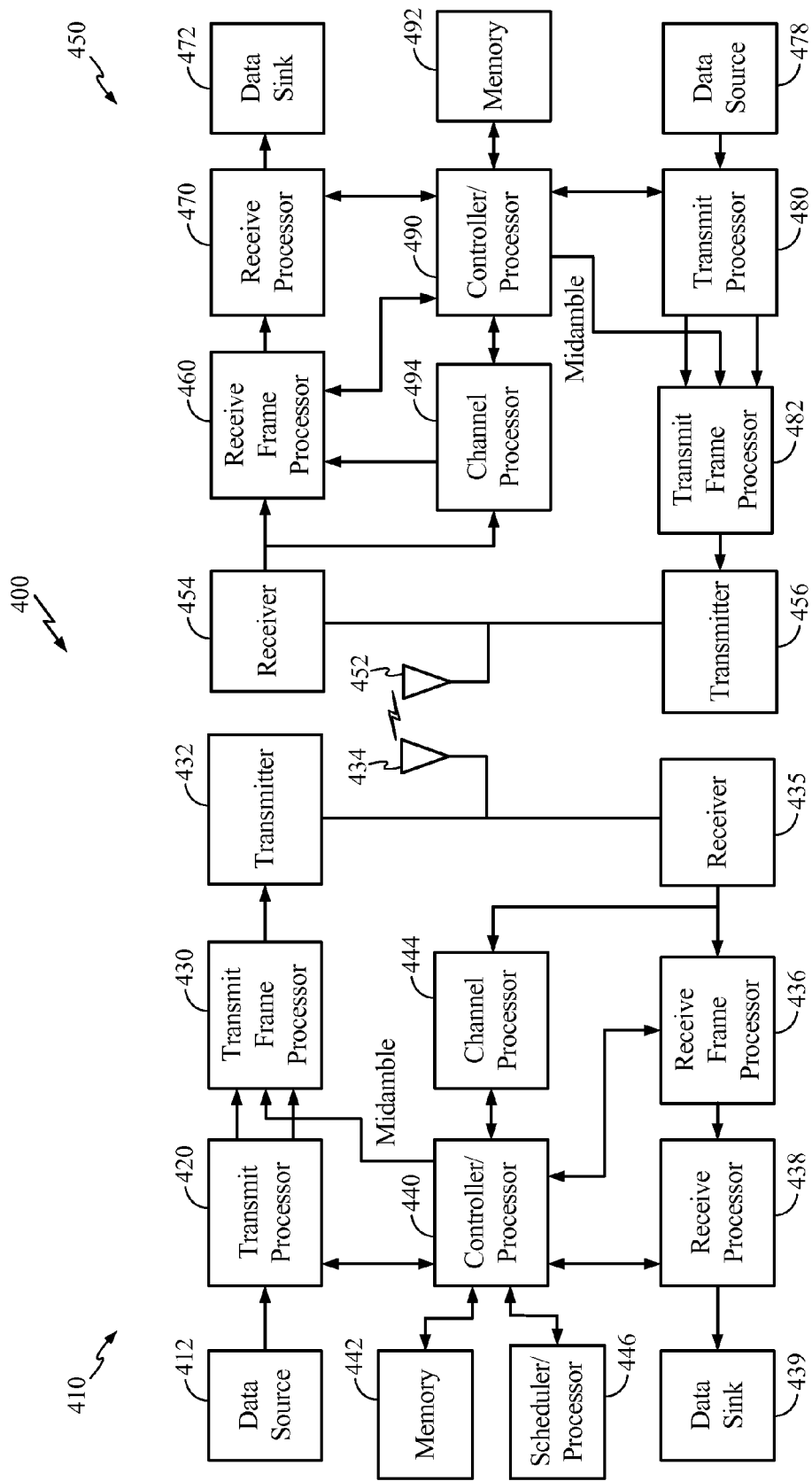
FIG. 4 is a conceptual diagram illustrating an example of a node B and UE in an access network.

FIG. 4 is a block diagram of a node B 410 in communication with a UE 450 in a RAN 400, where the RAN 400 may be the access network (RAN) 202 in FIG. 2, the node B 410 may be the node B 210 in FIG. 2, and the UE 450 may be the UE 210 in FIG. 2. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback contained in a signal from the UE 450. The symbols generated by the transmit processor 420 are provided to a transmit frame processor 430 to create a frame structure. The transmit frame processor 430 creates this frame structure by multiplexing the symbols with a data stream from the controller/processor 440, resulting in a series of frames. The frames are then provided to a transmitter 432, which provides various signal conditioning functions including amplifying, filtering, and modulating the frames onto a carrier for downlink transmission over the wireless medium through smart antennas 434. The smart antennas 434 may be implemented with beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information to a channel processor 494 and the data, control, and reference signals to a receive processor 470. The receive processor 470 then performs the inverse of the processing performed by the transmit processor 420 in the node B 410. More specifically, the receive processor 470 descrambles and despreads the symbols, and then determines the most likely signal constellation points transmitted by the node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests (or incremental retransmission in the case of HARQ) for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the node B 410, the transmit processor 480 provides various signal processing functions including CRC codes, coding and interleaving to facilitate FEC, mapping to signal constellations, spreading with OVSFs and/or channelization codes, and scrambling to produce a series of symbols. Channel estimates, derived by the channel processor 494 from a reference signal transmitted by the node B 410 or from feedback contained in the midamble transmitted by the node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with a midamble 214 (FIG. 2) from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides the information to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the node B 410 and the UE 450, respectively. A scheduler/processor 446 at the node B 410 may be used to allocate resources to the UEs and schedule downlink and/or uplink transmissions for the UEs.

Figure 5:
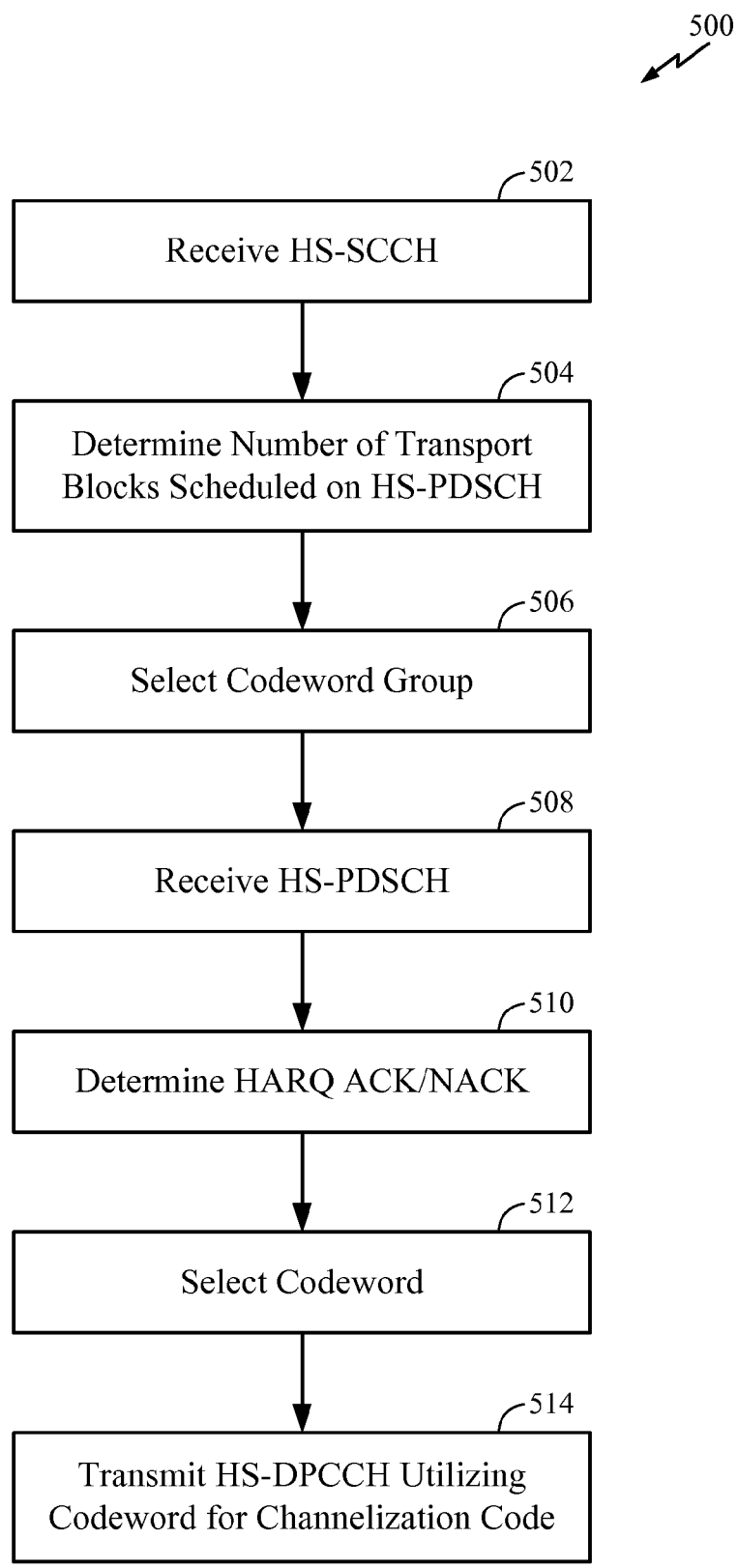
FIG. 5 is a conceptual diagram illustrating an example of a process of utilizing a single channelization code to provide HARQ ACK/NACK for DC-HSDPA+MIMO.

FIG. 5 is a flow chart illustrating a process 500 of wireless communication according to an aspect of the disclosure, wherein a single channelization code is utilized to convey a HARQ ACK/NACK for dual downlink channels, each of which may utilize MIMO. The process includes receiving information over the HS-SCCH (502). That is, in a DC-HSDPA system capable of utilizing MIMO, a scheduling message may be sent on the downlink, e.g., over HS-SCCH, to indicate whether one or both of the downlink carriers is a MIMO or a SIMO transmission. For example, this scheduling message may indicate how many transport blocks are scheduled to be transmitted over each carrier. This information may be provided to the UE over the HS-SCCH.

The process further includes determining the number of transport blocks scheduled on HS-PDSCH, e.g., according to the scheduling message on the HS-SCCH (504). Here, the UE may determine whether the node B has scheduled MIMO transmission on one or both of the downlink carriers in accordance with the scheduling message sent on the downlink (e.g., over HS-SCCH).

The process further includes selecting a codeword group (506). Here, the codeword group is one of a plurality of groups of codewords that may be utilized for the channelization code that corresponds to a composite HARQ ACK/NACK.

In general, a HARQ response may be an ACK or a NACK when the UE receives and either correctly or incorrectly decodes a transport block, respectively. When the UE does not receive the transport block at all, however, there is no HARQ response from the UE for that carrier. Thus, for a DC-HSDPA system that may be configured for MIMO on each of the downlink carriers, there are 50 potential HARQ ACK/NACK responses (hypotheses) (including PRE/POST) corresponding to all combinations of MIMO and DC-HSDPA scheduling events. (Those skilled in the art will comprehend that PRE/POST is utilized in HARQ for backwards compatibility with previous releases, and its function is well-known to those skilled individuals, so its explanation is omitted herein.)

It is important to note that while the node B in DC-HSDPA transmits on two carriers (i.e., a serving HS-DSCH cell and a secondary serving HS-DSCH cell), the UE may miss one of the carriers. That is, the UE may only receive information corresponding to one of the carriers. Here, the reception of the transmission of one of the carriers may be successfully decoded or incorrectly decoded. If the UE successfully decodes the transmission on the one carrier, it will send an ACK back to the node B corresponding to its success in relation to that carrier. If the UE has a decoding failure, it will send a NACK. However, if the UE missed the other carrier (e.g., the UE did not detect the HS-SCCH or the HS-PDSCH), it will not send anything (i.e., it will not send either an ACK or NACK corresponding to that carrier) back to the node B in relation to that carrier.

Thus, each of the HARQ ACK/NACK hypotheses corresponds to one of 50 possible HARQ responses from the UE to the node B for each of the downlink carriers, as illustrated in Table 6 (FIGS. 11A-11D). In one aspect of the disclosure, a different codeword may be assigned to each of the possible HARQ responses, e.g., assigning the numbers 1 to 50 to each HARQ hypothesis in the sequence illustrated in FIG. 11. However, according to an aspect of the disclosure, 50 distinct code words need not be defined, because different sets of hypotheses are mutually exclusive of one another. In particular, there are four sets of hypotheses that may be categorized according to whether MIMO is scheduled on one or both of the downlink carriers.

Group A: the node B schedules 1 transport block on the serving HS-DSCH cell (SIMO) and 1 transport block on the secondary serving HS-DSCH cell (SIMO).

Group B: node B schedules 1 transport block on the serving HS-DSCH cell (SIMO) and 2 transport blocks on the secondary serving HS-DSCH cell (MIMO).

Group C: node B schedules 2 transport blocks on the serving HS-DSCH cell (MIMO) and 1 transport block on the secondary serving HS-DSCH cell (SIMO).

Group D: node B schedules 2 transport blocks on the serving HS-DSCH cell (MIMO) and 2 transport blocks on the secondary serving HS-DSCH cell (MIMO).

Group A generally corresponds to DC-HSDPA as described in 3GPP Release 8, wherein MIMO is not configured on either carrier. Table 1 (FIG. 6) lists the 10 possible composite HARQ responses from the UE in this scenario. The hypotheses allow for the possibility that the UE missed decoding HS-SCCH on either of the carriers. For example, as indicated in Table 1, the first two entries correspond to the UE detecting a single scheduled transport block on the serving HS-DSCH cell, while not detecting anything on the secondary serving HS-DSCH cell. The second two entries correspond to the UE detecting a single scheduled transport block on the secondary serving HS-DSCH cell, while not detecting anything on the serving HS-DSCH cell. The four entries that follow correspond to the UE detecting a single scheduled transport block on each of the serving and secondary serving HS-DSCH cells. Finally, the PRE/POST entries complete the table.

In an aspect of the disclosure, the 10 code words specified in Release 8 for DC-HSDPA may be utilized whenever this combination of scheduling happens at the node B. However, those skilled in the art will comprehend that other code words may be utilized as well.

Group B, illustrated in Table 2 (FIG. 7) includes 16 possible composite HARQ responses from the UE. Here, Group B includes a greater number of HARQ hypotheses because of the additional transport block on the secondary serving HS-DSCH cell. Therefore, a codebook of 16 code words may be utilized to encode the respective HARQ ACK/NACK responses.

Group C, illustrated in Table 3 (FIG. 8) includes 16 possible combinations of HARQ responses from the UE. Therefore, a codebook of 16 code words may be utilized to encode the respective HARQ ACK/NACK responses.

Group D, illustrated in Table 4 (FIGS. 9A-9B) includes 26 possible combinations of HARQ responses from the UE. Therefore, a codebook of 26 code words may be utilized to encode the respective HARQ ACK/NACK responses.

Thus, in an aspect of the disclosure, four separate codebooks, each including channelization codes corresponding to the potential HARQ ACK/NACK hypotheses according to the scheduling message, may be designed, that is, one codebook for each of the four groups. Because the four groups may include different numbers of codewords, the same codewords may not be appropriate for different ones of the groups. That is, the flexibility to design the codebook for each group enables improved optimization of the link level properties of the codebook.

For example, in each of the codeword groups, the codebook may be designed to increase or maximize a distance property, e.g., the hamming distance, for each of the codewords. Because of the smaller numbers of codewords in comparison to an implementation that utilized one codebook for each HARQ ACK/NACK hypothesis for all four groups, the distances may be improved by separating the four groups. With a greater distance property, the error detection performance may be more reliable. That is, the greater the distance between codewords, the easier it may be to distinguish one codeword from another.

Returning to the flow chart of FIG. 5, once the appropriate codeword group is selected, the process receives information over one or more HS-PDSCH. That is, the UE may attempt to receive information on the downlink for each of the carriers, as scheduled on the HS-PDSCH. However, as discussed above, the UE may fail to accurately decode the information on one or more transport blocks on one or both of the downlink carriers. Thus, in block 510, the process determines the HARQ ACK/NACK for each of the scheduled transport blocks on each of the downlink carriers.

In block 512, the process selects a codeword from the codeword group selected in block 506, in accordance with the HARQ ACK/NACK as determined in block 510. Finally, in block 514, the process transmits on HS-DPCCH utilizing the selected codeword for the channelization code on the uplink.

In a further aspect of the disclosure, certain codewords may be re-used (e.g., the same codewords may be utilized) in different ones of the codeword groups in order to reduce or avoid ambiguity. For example, consider a case wherein a node B schedules MIMO (two transport blocks) on a first carrier, and SIMO (a single transport block) on a second carrier, and sends control information indicating this scenario to the UE over HS-SCCH. Suppose the UE fails to detect the stream on the first carrier (including the HS-SCCH and HS-DPCCH), and detects a stream on the second carrier. Here, there is no way for the UE to determine whether the carrier it missed is configured as SIMO or MIMO. That is, the UE may not have any way to determine whether the node B scheduled the transmissions on the two carriers as MIMO/SIMO or SIMO/SIMO. Thus, it is to the benefit of the UE that each of these two scenarios utilizes the same codeword. In this case, the UE may utilize the codebook for either MIMO/SIMO or SIMO/SIMO, as the entry corresponding to the HARQ ACK/NACK scenario will be the same in either codebook.

Table 5 (FIG. 10) illustrates the potential combinations of SIMO and MIMO streams that may be scheduled on the two carriers. Here, the row labeled "Node B Schedule" lists four possible combinations of SIMO and MIMO streams that may be scheduled on the two carriers. The "UE Detection Hypothesis or UE Transmit" row indicates the number of streams detected in each carrier and the number of possible codes for that particular combination of node B scheduling decision and UE detection. In this table, the notation x/y refers to x streams being detected by the UE on a first carrier, and y streams detected by the UE on a second carrier. For example, 2/1 denotes that two streams were detected by the UE on the first carrier and 1 stream was detected by the UE on the second carrier. The number in parentheses refers to the number of possible codes for that particular combination of node B scheduling (e.g., SIMO/SIMO, SIMO/MIMO, MIMO/SIMO, or MIMO/MIMO) and UE detection of streams. For example, when the node B schedules SIMO on the first carrier and MIMO on the second carrier, and the UE detects the HS-SCCH on each of the carriers, then the UE may respond with 8 possible codewords corresponding to 8 combinations of ACK or NACK on each stream.

Thus, when the node B schedules SIMO on each of the two carriers (SIMO/SIMO column), and when the node B schedules SIMO on the first carrier and MIMO on the second carrier (SIMO/MIMO column), and when the UE detects the stream on the first carrier but fails to detect the HS-SCCH on the second carrier (1/0), the two codewords corresponding to the two possible HARQ ACK/NACK hypotheses (i.e., ACK or NACK for the stream detected by the UE on the first carrier) for the SIMO/SIMO case may be the same as the two codewords for the SIMO/MIMO case. In this way, the UE may choose the codeword from either codebook, and the same channelization code will be utilized to communicate the HARQ ACK/NACK.

That is, in an aspect of the disclosure, codewords in the SIMO/SIMO codeword group corresponding to a failure to detect any transport blocks on the secondary serving HS-DSCH cell are the same as codewords in the SIMO/MIMO codeword group corresponding to a failure to detect any transport blocks on the secondary serving HS-DSCH cell (as indicated with the diagonal lines).

In another aspect of the disclosure, codewords in the SIMO/SIMO codeword group corresponding to a failure to detect any transport blocks on the serving HS-DSCH cell are the same as codewords in the MIMO/SIMO codeword group corresponding to a failure to detect any transport blocks on the serving HS-DSCH cell (as indicated with the dots).

In another aspect of the disclosure, codewords in the SIMO/MIMO codeword group corresponding to a failure to detect any transport blocks in the serving HS-DSCH cell are the same as codewords in the MIMO/MIMO codeword group corresponding to a failure to detect any transport blocks on the serving HS-DSCH cell (as indicated with the crosshatch).

In another aspect of the disclosure, codewords in the MIMO/SIMO codeword group corresponding to a failure to detect any transport blocks in the secondary serving HS-DSCH cell are the same as codewords in the MIMO/MIMO codeword group corresponding to a failure to detect any transport blocks in the secondary serving HS-DSCH cell (as indicated with the vertical lines).

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication over a DC-HSPA network, comprising:
   selecting a codeword group from a plurality of codeword groups in accordance with a number of transport blocks detected on each of a first carrier and a second carrier;
   selecting a codeword in the codeword group corresponding to a composite HARQ ACK/NACK in accordance with success or failure in decoding the at least one transport block on the at least one of the first carrier or the second carrier; and
   utilizing the selected codeword for a channelization code on an uplink channel.

2. The method of claim 1, further comprising receiving on a downlink channel a scheduling message for indicating the number of transport blocks scheduled on each of the first carrier and the second carrier.

3. The method of claim 2, wherein the downlink channel is a shared control channel.

4. The method of claim 1, wherein the utilizing of the selected codeword for a channelization code comprises spreading a signal on the uplink channel by combining the signal with the channelization code.

5. The method of claim 4, wherein the uplink channel is a dedicated physical control channel.

6. The method of claim 1, wherein the codeword groups comprise:
   a first group corresponding to a single scheduled transport block on the first carrier and a single scheduled transport block on the second carrier;
   a second group corresponding to a single scheduled transport block on the first carrier and two scheduled transport blocks on the second carrier;
   a third group corresponding to two scheduled transport blocks on the first carrier and a single scheduled transport block on the second carrier; and
   a fourth group corresponding to two scheduled transport blocks on the first carrier and two scheduled transport blocks on the second carrier.

7. The method of claim 6, wherein codewords in the first group corresponding to a failure to detect any transport blocks on the second carrier are the same as codewords in the second group corresponding to a failure to detect any transport blocks on the second carrier.

8. The method of claim 6, wherein codewords in the first group corresponding to a failure to detect any transport blocks on the first carrier are the same as codewords in the third group corresponding to a failure to detect any transport blocks on the first carrier.

9. The method of claim 6, wherein codewords in the second group corresponding to a failure to detect any transport blocks in the first carrier are the same as codewords in the fourth group corresponding to a failure to detect any transport blocks on the first carrier.

10. The method of claim 6, wherein codewords in the third group corresponding to a failure to detect any transport blocks in the second carrier are the same as codewords in the fourth group corresponding to a failure to detect any transport blocks in the second carrier.

11. An apparatus for wireless communication over a DC-HSDPA network, comprising:
   means for selecting a codeword group from a plurality of codeword groups in accordance with a number of transport blocks detected on each of a first carrier and a second carrier;
   means for selecting a codeword in the codeword group corresponding to a composite HARQ ACK/NACK in accordance with success or failure in decoding the at least one transport block on the at least one of the first carrier or the second carrier; and
   means for utilizing the selected codeword for a channelization code on an uplink channel.

12. The apparatus of claim 11, further comprising means for receiving on a downlink channel a scheduling message for indicating the number of transport blocks scheduled on each of the first carrier and the second carrier.

13. The apparatus of claim 12, wherein the downlink channel is a shared control channel.

14. The apparatus of claim 11, wherein the means for utilizing the selected codeword for a channelization code comprises means for spreading a signal on the uplink channel by combining the signal with the channelization code.

15. The apparatus of claim 14, wherein the uplink channel is a dedicated physical control channel.

16. The apparatus of claim 11, wherein the codeword groups comprise:
   a first group corresponding to a single scheduled transport block on the first carrier and a single scheduled transport block on the second carrier;
   a second group corresponding to a single scheduled transport block on the first carrier and two scheduled transport blocks on the second carrier;
   a third group corresponding to two scheduled transport blocks on the first carrier and a single scheduled transport block on the second carrier; and
   a fourth group corresponding to two scheduled transport blocks on the first carrier and two scheduled transport blocks on the second carrier.

17. The apparatus of claim 16, wherein codewords in the first group corresponding to a failure to detect any transport blocks on the second carrier are the same as codewords in the second group corresponding to a failure to detect any transport blocks on the second carrier.

18. The apparatus of claim 16, wherein codewords in the first group corresponding to a failure to detect any transport blocks on the first carrier are the same as codewords in the third group corresponding to a failure to detect any transport blocks on the first carrier.

19. The apparatus of claim 16, wherein codewords in the second group corresponding to a failure to detect any transport blocks in the first carrier are the same as codewords in the fourth group corresponding to a failure to detect any transport blocks on the first carrier.

20. The apparatus of claim 16, wherein codewords in the third group corresponding to a failure to detect any transport blocks in the second carrier are the same as codewords in the fourth group corresponding to a failure to detect any transport blocks in the second carrier.

21. A computer program product, comprising:
   a non-transitory computer-readable medium comprising code for:
      selecting a codeword group from a plurality of codeword groups in accordance with a number of transport blocks detected on each of a first carrier and a second carrier;
      selecting a codeword in the codeword group corresponding to a composite HARQ ACK/NACK in accordance with success or failure in decoding the at least one transport block on the at least one of the first carrier or the second carrier; and utilizing the selected codeword for a channelization code on an uplink channel.

22. The non-transitory computer program product of claim 21, wherein the computer-readable medium further comprises code for receiving on a downlink channel a scheduling message for indicating the number of transport blocks scheduled on each of the first carrier and the second carrier.

23. The computer program product of claim 22, wherein the downlink channel is a shared control channel.

24. The computer program product of claim 21, wherein the code for utilizing the selected codeword for a channelization code comprises code for spreading a signal on the uplink channel by combining the signal with the channelization code.

25. The computer program product of claim 24, wherein the uplink channel is a dedicated physical control channel.

26. The computer program product of claim 21, wherein the codeword groups comprise:
a first group corresponding to a single scheduled transport block on the first carrier and a single scheduled transport block on the second carrier;
a second group corresponding to a single scheduled transport block on the first carrier and two scheduled transport blocks on the second carrier;
a third group corresponding to two scheduled transport blocks on the first carrier and a single scheduled transport block on the second carrier; and
a fourth group corresponding to two scheduled transport blocks on the first carrier and two scheduled transport blocks on the second carrier.

27. The computer program product of claim 26, wherein codewords in the first group corresponding to a failure to detect any transport blocks on the second carrier are the same as codewords in the second group corresponding to a failure to detect any transport blocks on the second carrier.

28. The computer program product of claim 26, wherein codewords in the first group corresponding to a failure to detect any transport blocks on the first carrier are the same as codewords in the third group corresponding to a failure to detect any transport blocks on the first carrier.

29. The computer program product of claim 26, wherein codewords in the second group corresponding to a failure to detect any transport blocks in the first carrier are the same as codewords in the fourth group corresponding to a failure to detect any transport blocks on the first carrier.

30. The computer program product of claim 26, wherein codewords in the third group corresponding to a failure to detect any transport blocks in the second carrier are the same as codewords in the fourth group corresponding to a failure to detect any transport blocks in the second carrier.

31. An apparatus for wireless communication over a DC-HSDPA network, comprising:
a processing system configured to:
select a codeword group from a plurality of codeword groups in accordance with a number of transport blocks detected on each of a first carrier and a second carrier;
select a codeword in the codeword group corresponding to a composite HARQ ACK/NACK in accordance with success or failure in decoding the at least one transport block on the at least one of the first carrier or the second carrier; and
utilize the selected codeword for a channelization code on an uplink channel.

32. The apparatus of claim 31, wherein the processing system is further configured to receive on a downlink channel a scheduling message for indicating the number of transport blocks scheduled on each of the first carrier and the second carrier.

33. The apparatus of claim 32, wherein the downlink channel is a shared control channel.

34. The apparatus of claim 31, wherein the utilizing of the selected codeword for a channelization code comprises spreading a signal on the uplink channel by combining the signal with the channelization code.

35. The apparatus of claim 34, wherein the uplink channel is a dedicated physical control channel.

36. The apparatus of claim 31, wherein the codeword groups comprise:
a first group corresponding to a single scheduled transport block on the first carrier and a single scheduled transport block on the second carrier;
a second group corresponding to a single scheduled transport block on the first carrier and two scheduled transport blocks on the second carrier;
a third group corresponding to two scheduled transport blocks on the first carrier and a single scheduled transport block on the second carrier; and
a fourth group corresponding to two scheduled transport blocks on the first carrier and two scheduled transport blocks on the second carrier.

37. The apparatus of claim 36, wherein codewords in the first group corresponding to a failure to detect any transport blocks on the second carrier are the same as codewords in the second group corresponding to a failure to detect any transport blocks on the second carrier.

38. The apparatus of claim 36, wherein codewords in the first group corresponding to a failure to detect any transport blocks on the first carrier are the same as codewords in the third group corresponding to a failure to detect any transport blocks on the first carrier.

39. The apparatus of claim 36, wherein codewords in the second group corresponding to a failure to detect any transport blocks in the first carrier are the same as codewords in the fourth group corresponding to a failure to detect any transport blocks on the first carrier.

40. The apparatus of claim 36, wherein codewords in the third group corresponding to a failure to detect any transport blocks in the second carrier are the same as codewords in the fourth group corresponding to a failure to detect any transport blocks in the second carrier.

* * * * *